(12) United States Patent
Cohen et al.

(10) Patent No.: US 8,930,914 B2
(45) Date of Patent: Jan. 6, 2015

(54) SYSTEM AND METHOD FOR DOCUMENTING APPLICATION EXECUTIONS

(71) Applicant: International Business Machines Corporation, Armonk, NY (US)

(72) Inventors: Mitchell A. Cohen, Yorktown Heights, NY (US); Andrew Lawrence Frenkiel, Irvington, NY (US); Bugra Gedik, Ankara (TR)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 13/761,602

(22) Filed: Feb. 7, 2013

(65) Prior Publication Data

US 2014/0223416 A1 Aug. 7, 2014

(51) Int. Cl.
*G06F 9/44* (2006.01)
*G06F 11/34* (2006.01)

(52) U.S. Cl.
CPC ............. *G06F 11/3476* (2013.01); *G06F 8/73* (2013.01)
USPC ............ 717/128; 717/127; 717/129; 717/130

(58) Field of Classification Search
None
See application file for complete search history.

(56) References Cited

U.S. PATENT DOCUMENTS

| | | | | |
|---|---|---|---|---|
| 6,438,512 | B1 * | 8/2002 | Miller | 702/186 |
| 7,292,961 | B2 * | 11/2007 | Dias et al. | 702/186 |
| 7,509,632 | B2 * | 3/2009 | Boger | 717/133 |
| 7,860,836 | B1 * | 12/2010 | Natanzon et al. | 707/648 |
| 8,122,006 | B2 | 2/2012 | de Castro Alves et al. | |
| 8,126,825 | B2 * | 2/2012 | Guyon | 706/12 |
| 8,434,067 | B2 * | 4/2013 | Nagabhushan et al. | 717/127 |
| 2006/0064687 | A1 * | 3/2006 | Dostert | 718/1 |
| 2008/0148235 | A1 * | 6/2008 | Foresti et al. | 717/123 |
| 2009/0278937 | A1 * | 11/2009 | Botchen et al. | 348/169 |
| 2011/0197097 | A1 * | 8/2011 | Beaty et al. | 714/27 |
| 2011/0258216 | A1 * | 10/2011 | Supakkul et al. | 707/769 |
| 2011/0307828 | A1 * | 12/2011 | Chilimbi et al. | 715/802 |
| 2013/0246995 | A1 * | 9/2013 | Ferrao et al. | 717/104 |

OTHER PUBLICATIONS

Fitch, et al., "Blue Matter, An Application Framework for Molecular Simulation on Blue Gene," IBM Research Report RC22683, May 29, 2003.
Waldbusser, "Application Performance Measurement MIB," Network Working Group RFC 3729, 2004.
Deville, et al., "Performance Monitoring for Run-Time Management of Reconfigurable Devices," In Engineering of Reconfigurable Systems and Algorithms (ERSA) 2005.
Gopisetty, et al., "Evolution of Storage Management: Transforming Raw Data into Information," IBM J. Res. & Dev. volume 52, No. 4/5 Jul./Sep. 2008.
Li, et al., "A Runtime and Analysis Framework Support for Unit Component Testing in Distributed Systems," Proceedings of the 40th Hawaii International Conference on System Sciences, 2007.

* cited by examiner

*Primary Examiner* — Isaac T Tecklu
*Assistant Examiner* — Hossain Morshed
(74) *Attorney, Agent, or Firm* — Jose Gutman; Fleit Gibbons Gutman Bongini & Bianco PL (57) ABSTRACT

An information processing system, computer readable storage medium, and method for documenting the execution of long running applications. A processor of the information processing system operates to continuously collect snapshots monitored from an executing application on a runtime system. The processor selects, based at least on user specified policies, collected snapshots that indicate a significant change in runtime behavior of the executing application on the runtime system. The processor annotates each of the selected snapshots with description of the significant change in runtime behavior of the executing application. The processor operates to store and update documentation of an execution history of the executing application from the annotated snapshots.

25 Claims, 7 Drawing Sheets

| | 302 | 304 | 306 |
|---|---|---|---|
| | TAG | DELTA | CLEAR HISTORY |
| 308 | @total_runningtime | 2400 | ☐ |
| 310 | @throughput_tuples_max | 10000 | ☐ |
| 312 | @orders_processed | 200,000 | ☐ |
| 314 | Etc ... | | |

FIG. 3

```
/**
 * Given an order request, this operator checks the customers credit, checks and updates
 * inventory for the ordered part number and outputs an OrderResponse record.
 * @input orderRequests an input stream of order requests
 * @output orderResponses an output stream of order responses
 */
composite OrderProcessor (output stream<OrderResponseType> orderResponses;
                input stream<OrderRequestType> orderRequests) {

// Source code not shown ....

// Report the number of orders processed – an application specific metric
    setCustomMetricValue("orders_processed", num_orders);
}
```

FIG. 4

```
/**
 * Given an order request, this operator checks the customers credit, checks and updates
 * inventory for the ordered part number and outputs an OrderResponse record.
 * @input orderRequests an input stream of order requests
 * @output orderResponses an output stream of order responses
 * @updated Thu Oct 11 12:32:05 EDT 2012
 * @total_runningtime: 530H,10M,11S
 * @throughput_tuples_max 10K/sec
 * @throughput_tuples_avg 3K/sec
 * @throughput_bytes_max 14121K/sec
 * @throughput_bytes_avg 155K/sec
 * @orders_processed 810,000
 * @upstream_operators_last OrderEntry
 * @downstream_operators_last ShipProcessor, BillProcessor
 * @change_description_last increased throughput_tuples_max from 0K/sec
 * @context initial deployment
 */
composite OrderProcessor (output stream<OrderResponseType> orderResponses;
                          input stream<OrderRequestType> orderRequests) {
    // Source code not shown ....

// Report the number of orders processed -- an application specific metric
    setCustomMetricValue("orders_processed", num_orders);
}
```

FIG. 5

```
/**
 * Given an order request, this operator checks the customers credit, checks and updates
 * inventory for the ordered part number and outputs an OrderResponse record.
 * @input orderRequests an input stream of order requests
 * @output orderResponses an output stream of order responses
 * @updated Thu Oct 19 00:37:15 EDT 2012
 * @total_runningtime: 734H,15M,21S
 * @throughput_tuples_max 10K/sec
 * @throughput_tuples_avg 4K/sec
 * @throughput_bytes_max 14121K/sec
 * @throughput_bytes_avg 182K/sec
 * @orders_processed 1,010,000
 * @upstream_operators_last OrderEntry
 * @downstream_operators_last ShipProcessor, BillProcessor
 * @change_description_last orders_processed increased by 200,000
 * @context_last new product announcement October 18
 */
composite OrderProcessor (output stream<OrderResponseType> orderResponses;
                         input stream<OrderRequestType> orderRequests) {
    // Source code not shown ...

// Report the number of orders processed -- an application specific metric
    setCustomMetricValue("orders_processed", num_orders);
}
```

SYSTEM AND METHOD FOR DOCUMENTING APPLICATION EXECUTIONS

STATEMENT REGARDING FEDERALLY SPONSORED RESEARCH OR DEVELOPMENT

This invention was made with Government support under Contract No.: H98230-11-C-0276 awarded by Department of Defense. The Government has certain rights in this invention.

BACKGROUND

The present disclosure generally relates to monitoring execution of applications on a runtime system and documenting the observed behavior of the applications, and more particularly relates to an information processing system that monitors the execution of an application and automatically generates documentation for the executing application from the monitored information.

Understanding the behavior of long running applications with strong run-time dynamics is very challenging. This is due to the need for capturing the history of changes in runtime behavior that happen during the execution of the application, and determining the change events that are worthy of inclusion in this history. Furthermore, significant changes in the runtime behavior, such as variations in the application topology, workload, or runtime state and metrics, could be difficult to digest by a human operator. Therefore, automatic monitoring of application runtime behavior has been attempted with marginal success in collecting and identifying relevant information. Typically, a human operator has to analyze the collected information over time and then summarize what information the human operator determines to be relevant in a report or other documentation. This can be a tedious and inefficient process for a human operator.

BRIEF SUMMARY

In one embodiment, a method with an information processing system is disclosed. The method includes continuously collecting, with a processor of the information processing system communicatively coupled with a runtime system, snapshots monitored from an executing application on the runtime system; selecting, with the processor and based at least on user specified policies, collected snapshots that indicate a significant change in runtime behavior of the executing application on the runtime system; annotating, with the processor, each of the selected snapshots with at least description of the significant change in runtime behavior of the executing application on the runtime system at the time the selected snapshot was collected; and storing and updating documentation of an execution history of the executing application on the runtime system from the collected and annotated snapshots.

In another embodiment, an information processing system includes memory; at least one interface module communicatively coupled with a runtime system that executes at least one application thereon; a policies repository; a snapshots repository; and a processor communicatively coupled to the memory, the policies repository; the interface module, and the snapshots repository, wherein the processor, responsive to executing computer instructions, performs operations comprising: continuously collecting snapshots monitored from an executing application on the runtime system; selecting, based at least on user specified policies in the policies repository, collected snapshots that indicate a significant change in runtime behavior of the executing application on the runtime system; annotating each of the selected snapshots with at least description of the significant change in runtime behavior of the executing application on the runtime system at the time the selected snapshot was collected; and storing and updating documentation of an execution history of the executing application on the runtime system from the collected and annotated snapshots.

In yet another embodiment, a computer readable storage medium, including computer instructions which, responsive to being executed by a processor, cause the processor to perform operations comprising: continuously collecting, with a processor of an information processing system communicatively coupled with a runtime system, snapshots monitored from an executing application on the runtime system; selecting, with the processor and based at least on user specified policies, collected snapshots that indicate a significant change in runtime behavior of the executing application on the runtime system; annotating, with the processor, each of the selected snapshots with at least description of the significant change in runtime behavior of the executing application on the runtime system at the time the selected snapshot was collected; and storing and updating documentation of an execution history of the executing application on the runtime system from the collected and annotated snapshots.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

In the past it was challenging to capture information from an executing application and then to use the captured information to embellish documentation for the source code of the application. Particularly, understanding the changing behavior of long-running applications with strong run-time dynamics, such as streams processing applications, has been a challenge. There is a need for capturing the history of changes in the runtime behavior and environment of the executing application. It is especially important to determine any significant change events that occurred while the application has been executing on a runtime system. Significant change events are those events that are worthy of inclusion in a captured history of the executing application.

Furthermore, significant changes in the runtime behavior, such as variations in the application topology, workload, or runtime state and metrics, could be difficult to digest by a human operator, unless automatic detection and annotation capabilities are present to summarize these changes and relate them back to application artifacts and code. There is also a need for manual annotations of the history, so that semantic information that cannot be derived solely from application artifacts and runtime behavior metrics, such as information that comes from a domain expert, can be included in the execution history as well.

Further, it is important to understand the usage of source code artifacts. This includes understanding the context in which source code artifacts for an application are used and how the source code artifacts are composed for a particular application.

Stream processing applications with runtime dynamics are particularly difficult to monitor and to collect significant changes in the executing application. For example, job submissions and cancellations, dynamic connection updates, changes in input rates, changes in output rates, changes in workload characteristics, and detecting failures and restarts of an executing application, are just a few of the types of runtime dynamics that are addressed as part of monitoring and collecting significant changes in the executing application.

Disclosed, according to various embodiments, is an information processing system that monitors the execution of an application on a runtime system and generates documentation for the executing application from the monitored information and from related information. The information processing system can monitor long-running applications that exhibit strong run-time dynamics, such as stream processing applications. The information processing system continuously collects snapshots of the executing application and provides a user interface view where an administrator can travel in the history of the execution of the application and navigate to the documentation of the application source code artifacts that are active in the currently viewed snapshot of the execution history. Furthermore, the system employs methods to automatically detect relevant changes in the application's runtime behavior and only includes snapshots that are representative of the important changes in the execution history. The information processing system provides automatic annotations as part of the documentation generated for the snapshot, and also enables manual annotation by human users.

According to various embodiments of the disclosure, an information processing system can monitor the execution of an application and generate documentation from it. The system can collect periodic snapshots of metric information from 1) the executing application, and 2) the runtime system which is the platform for the executing application. The information processing system can determine if the captured snapshot constitutes a significant change in the runtime behavior of the executing application. This determination will be based on user-specified policies that specify events of interest and identify conditions and events that trigger the determination of a significant change.

If the captured snapshot information is determined to be a significant change in the runtime behavior of the executing application, the information processing system can store the snapshot information in an execution history repository for the executing application. Also, the information processing system will generate a set of annotations that describe why the snapshot is relevant. These annotations can include meta data, such as tags, that can be added to the comments documentation associated with the source code of the executing application to memorialize the significant change event in the source code artifacts of the executing application. Optionally, the information processing system can provide access via a user interface for a human operator, an application administrator, or other technical personnel, to generate and include manual annotation descriptions in natural language to the captured snapshot.

The information processing system then can associate the runtime source code artifacts documentation captured in the snapshots with their source code artifacts documentation for the executing application. A new job with a new set of analytics may be submitted to the runtime system, as necessary. The updated source code artifacts documentation for the executing application provides rich amounts of run-time information for a programmer, a system administrator, or other user of the application, to better understand the application and its runtime behavior.

Additionally, the information processing system can mine usage information from the execution history documentation and use it to improve the documentation for the source code artifacts of the executing application. The information processing system can compute usage information, track the health of the executing application, track performance of the application, track status of the executing application, and other such information, for inclusion in the source code artifacts documentation associated with the executing application. The information processing system can also detect outliers in certain metrics monitored from the executing application and the runtime system. Moreover, the information processing system can capture information including, but not limited to, information that tracks frequently used artifacts, co-usage statistics with respect to related source code artifacts, and other relevant measures of interests, which overall enhances the source code artifact documentation of the executing application with run-time statistics, measures, and related semantic information that may be provided by an application expert in natural language.

Figure 1:
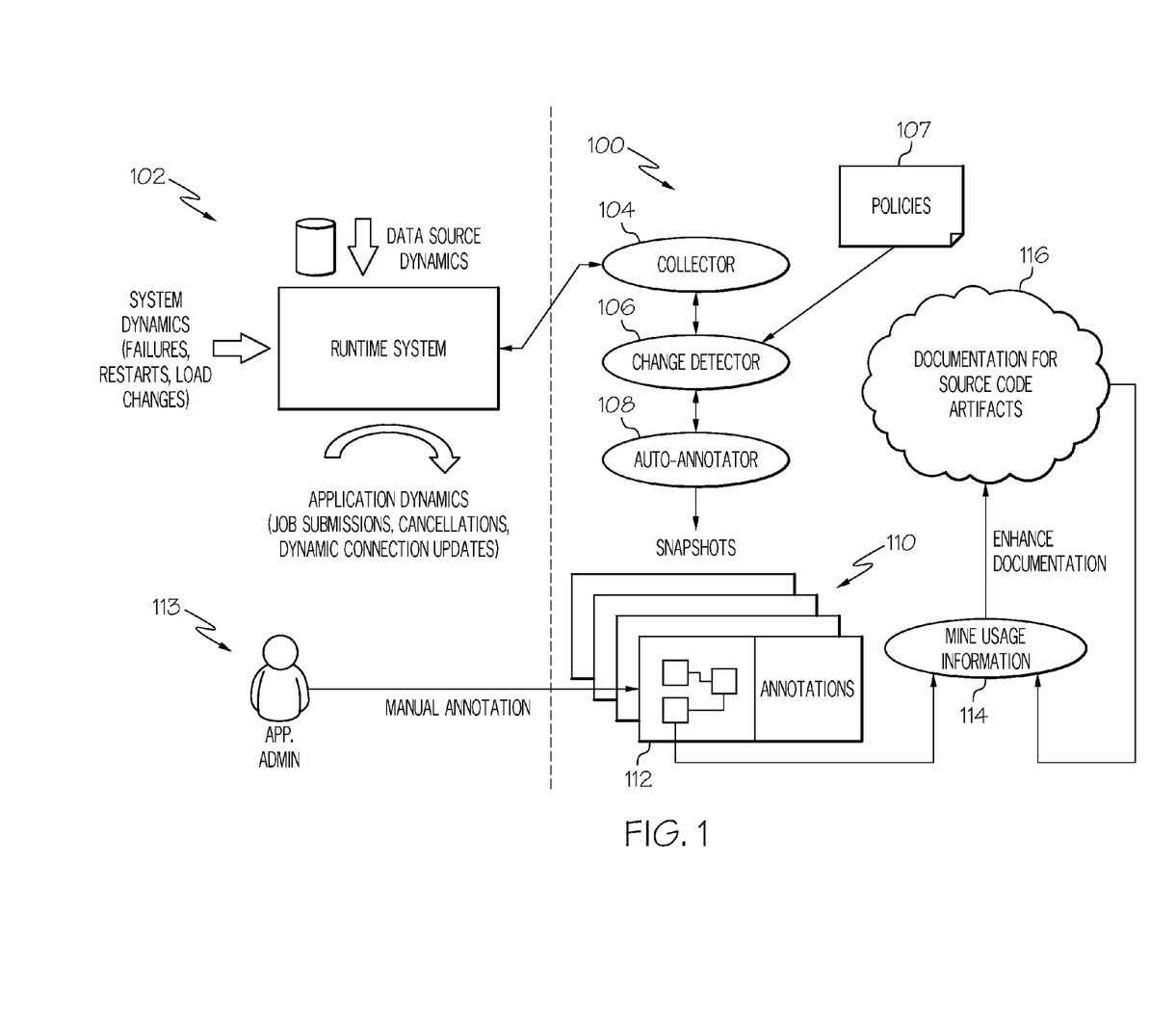
FIG. 1 is a block diagram illustrating an example of an information processing system coupled to a runtime system, according to an embodiment of the present disclosure.

FIG. 1 shows one example of an operating environment for an information processing system 100, which is applicable to various embodiments of the present disclosure. Referring to FIG. 1, an information processing system 100 monitors the execution of one or more applications that are executing on a runtime system 102. While the term application is used throughout this disclosure, it should be understood that an application can also broadly mean any portion of an application, including, but not limited to, any method, procedure, function, operator, element, or component, of an application. Additionally, while the singular term application may be used in the present discussion, the plural and singular of the term application are interchangeable and equally apply where appropriate. That is, according to various embodiments, multiple applications may be contemporaneously monitored executing on the runtime system and documentation can be generated for each such application.

The information processing system 100 generates documentation from the monitored information that enhances and further documents the source code artifacts associated with the executing applications. Significant changes in the runtime behavior of a running application, such as variations in application topology, work load, or runtime state and metrics, can be easily added to the source code artifacts of the executing application. Additionally, the information processing system 100 provides opportunity for manual documentation of the source code artifact such that significant changes can be further documented in natural language with semantics (semantic information) of the conditions surrounding the significant change as may be understood by a user of the information processing system, such as an application system administrator or an application system architect. These significant changes are captured as snapshots of the running application on the runtime system 102.

The runtime system 102, as shown in FIG. 1, is affected by data source dynamics, system dynamics such as failures, re-starts, and load changes, and application dynamics such as job submissions, cancellations, and dynamic connection updates. One or more monitors (not shown) are communicatively coupled with the runtime system 102 such that they can monitor the runtime behavior of the executing application. The monitored information is reported by the monitors to the collector 104 in the information processing system 100. The settings for these monitors can be provided from the information processing system 100 as necessary for the executing application on the runtime system 102.

The collector 104 collects the monitored information, which represents runtime behavior of the application executing on the runtime system 102, and temporarily stores this monitored information as a snapshot of the executing application. This captured snapshot includes performance metrics of the running application that are captured by the monitors and provided to the information processing system 100. The metrics collected can include metrics reported by monitors coupled with the application and metrics reported by monitors coupled with the runtime system 102.

User specified and configured policies in a policies repository 107 are used by the information processing system 100 to determine the occurrence of events of interest and interesting metrics that identify significant changes in the running application. A change detector 106 analyzes the captured snapshot of information from the running application on the runtime system 102 and applies policies 107 in the analysis to determine if an event of interest indicating a significant change has occurred in the runtime behavior of the executing application. An event of interest may comprise a monitored metric of the runtime system, a monitored metric of the executing application, or other similar metric, that indicates a runtime behavior of the executing application on the runtime system.

Once a significant change in the application running on the runtime system 102 is detected by the change detector 106, the snapshot is annotated by the auto-annotator 108. Additional documentation is added by the auto-annotator 108 to the source code artifacts associated with the documentation of the executing application on the runtime system 102. The captured snapshot is stored in a snapshot repository 110 for the running application on the runtime system 102. The particular snapshot 112 that is stored in the snapshot repository 110 can be manually annotated by an application system administrator 113.

The information processing system 100 can include a miner of usage information 114 that analyzes the usage information from the particular snapshot 112. It also analyzes information stored in the source code artifact documentation repository 116 which includes, but is not limited to the source code artifacts documentation for the executing application, source code artifacts documentation for previous versions of the application, and source code artifacts documentation from related application components that are not in the current version of the application. The miner of usage information 114 thereby provides enhanced documentation to the application's source code artifacts documentation stored in the source code artifact documentation repository 116. The enhanced documentation is added to the documentation of the executing application on the runtime system 102 stored in the source code documentation repository 116. In this way, the source code artifacts documentation of the executing application can be updated automatically as well as manually based on significant changes in metrics of the executing application as well as associated usage information for the executing application.

Figure 2:
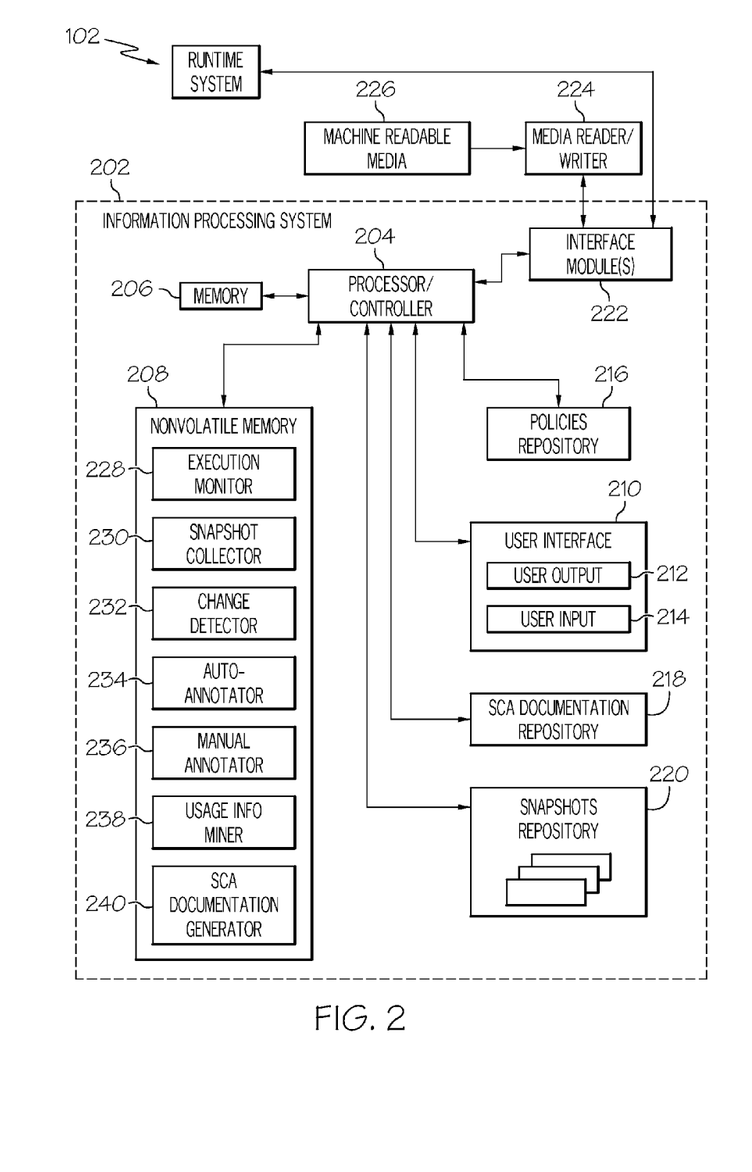
FIG. 2 is a block diagram illustrating another example of an information processing system coupled to a runtime system, according to an embodiment of the present disclosure.

FIG. 2 illustrates an alternative view of an information processing system 202 that monitors executing applications on a runtime system 102. The information processing system 202 includes at least one processor/controller 204 that is communicatively coupled with memory 206. The processor/controller 204 is also communicatively coupled with non-volatile memory 208 that stores data and programs used by the processor/controller 204 to provide the new and novel functions of the present disclosure.

A user interface 210 is communicatively coupled with the processor/controller 204 and provides a user input interface 214 for receiving user input communication from a user of the information processing system 202 and a user output interface 212 for providing communication to a user of the information processing system 202.

The user interface 210 includes a user output interface 212 that may include one or more display devices to display information to a user of the system 202. A display device (not shown) can include a monochrome or color Liquid Crystal Display (LCD), Organic Light Emitting Diode (OLED) or other suitable display technology for conveying images to a user of the information processing system 202. A display device can include, according to certain embodiments, touch screen technology, e.g., a touchscreen display, which also serves as a user input interface 214 for detecting user input (e.g., touch of a user's finger). A display device, according to certain embodiments, comprises a graphical user interface (GUI). One or more speakers in the user output interface 212 can provide audible information to the user, and one or more indicators can provide indication of certain conditions of the system 202 to the user. The indicators can be visible, audible, or tactile, thereby providing necessary indication information to the user of the information processing system 202.

The user interface 210 includes a user input interface 214 that may include one or more keyboards, keypads, mouse input device, track pad, and other similar user input devices. A microphone is included in the user input interface 214, according to various embodiments, as an audio input device that can receive audible signals from a user. The audible signals can be digitized and processed by audio processing circuits and coupled to the processor/controller 204 for voice recognition applications such as for the information processing system 202 to receive data and commands as user input from a user.

A source code artifact documentation repository 218 is communicatively coupled with the processor/controller 204. The source code artifact documentation repository 218 may comprise persistent or non-volatile memory that can permanently store source code artifact documentation for one or more applications that run on the runtime system 102.

A history of each source code artifact documentation of an application may be stored in the source code artifact documentation repository 218. This history can be maintained using version control mechanisms to allow a user to view a history of versions of particular elements or components of an application (and the associated source code artifact documentation).

Additionally, a snapshot repository 220 is communicatively coupled with the processor/controller 204. The snapshot repository 220 is used by the information processing system 202 to store one or more snapshots associated with significant changes of the executing application on the runtime system 102. Other information may be stored in the snapshot repository 220 and associated with the executing application on the runtime system 102 as may be necessary or desired to track the application and it's components or elements, to associate the snapshots in the snapshot repository 220 with particular source code artifact documentation in the source code artifact documentation repository 218, and other related application administration information associated with the particular application executing on the runtime system 102.

One or more input/output interface modules 222 are communicatively coupled with the processor/controller 204. In this way, the information processing system 202 is able to communicate with other systems and devices. For example, the runtime system 102 is communicatively coupled via the input/output interface modules 222 with the processor/controller 204. A media reader/writer device 224, for example, is also communicatively coupled with the input/output interface modules 222 and thereby accessible by the processor/controller 204. Machine readable media 226, which are a form of computer readable storage medium, may be coupled with the media reader/writer 224 to provide information via the input/output interface module 222 to the processor/controller 204 of the information processing system 202. For example, data and instructions for the processor/controller 204 may be provided via the machine readable media 226.

As discussed above with reference to FIG. 1, one or more execution monitors are communicatively coupled with the runtime system 102 to monitor an executing application on the runtime system 102. This monitor can reside in the runtime system 102 and communicate via the input/output interface modules 222 with the processor/controller 204 interoperating with the execution monitor 228. The execution monitor 228 operates with the one or more monitors in the runtime system 102 to monitor the runtime behavior and metrics of the executing application on the runtime system 102. These one or more monitors may include one or more monitors coupled with the executing application, or coupled with the runtime system 102, or both. A snapshot collector 230 collects the information captured by the execution monitor 228 from the executing application on the runtime system 102 and creates a snapshot that is temporarily stored in memory 206.

A change detector 232 interoperates with the processor/controller 204 to analyze the stored snapshot information with reference to one or more policies stored in the policies repository 216, which is communicatively coupled with the processor/controller 204. The one or more policies stored in the policies repository 216 are specifically associated with the executing application on the runtime system 102. The policies indicate conditions for significant change in the executing application thereby causing the information processing system 202 to select and capture a snapshot of the significant change of the executing application. For example, the processor/controller 204 can compare a value of a metric in a current collected snapshot with a value of a corresponding metric in the last previous collected and annotated snapshot included in the execution history. The processor/controller 204 can thereby determining whether the current collected snapshot belongs in the execution history, based on a result of the comparing and on a user specified policy corresponding to the metric.

An auto-annotator 234 interoperates with the processor/controller 204 to automatically annotate the captured snapshots with text documentation that is added to the snapshot information. A manual-annotator 236 interoperates with a processor/controller 204 and the user interface 210 to allow an application administrator 113 (or other technical personnel) to manually annotate user-created information documentation in the snapshot captured and stored for the executing application on the runtime system 102. For example, an application expert may provide semantic information in natural language describing the event that caused the significant change which can be included as documentation with the snapshot. The user can summarize, using natural language, a significant change detected in a value of a metric in a current collected snapshot as compared with a value of a corresponding metric in the last previous collected and annotated snapshot included in the execution history, by explaining how the significant change relates to a user specified policy corresponding to the metric.

A usage information miner 238 interoperates with the processor/controller 204 to analyze usage information from the captured snapshot and from source code artifact documentation stored in the source code artifact documentation repository 218 that is related to the executing application on the runtime system 102. The usage information miner 238 can analyze the usage information from the snapshot and from the source code artifact documentation repository and further update the source code artifact documentation stored in the source code documentation repository 218 for the executing application on the runtime system 102. That is, source code artifacts documentation can be updated with mined usage information.

Also, according to various embodiments, the usage information miner 238 can compute statistics about the mined usage information, performance of the executing application on the runtime system, and health of source code artifacts of the executing application. Further, the usage information miner 238 can determining at least one of: outliers of metrics of the runtime behavior of the executing application on the runtime system; frequently used source code artifacts associated with the executing application on the runtime system; co-usage statistics of source code artifacts associated with the executing application on the runtime system; and other relevant metrics of interests about source code artifacts associated with the executing application on the runtime system. Additionally, the usage information miner 238 can update source code artifacts documentation of the executing application to include documentation with at least one of: computed statistics about the mined usage information; computed statistics about the performance of the executing application on the runtime system; computed statistics about the health of source code artifacts of the executing application; determined outliers of metrics of the runtime behavior of the executing application on the runtime system; determined frequently used source code artifacts associated with the executing application on the runtime system; determined co-usage statistics of source code artifacts associated with the executing application on the runtime system; and determined other relevant metrics of interests about source code artifacts associated with the executing application on the runtime system.

A source code documentation generator 240 can be used by the processor/controller 204 to generate documentation from the stored snapshot. The source code documentation generator 240 also can store the generated documentation in the source code artifact documentation repository 218, as may be required by any of the auto-annotator 234, the manual-annotator 236, and the usage information miner 238.

Figure 3:
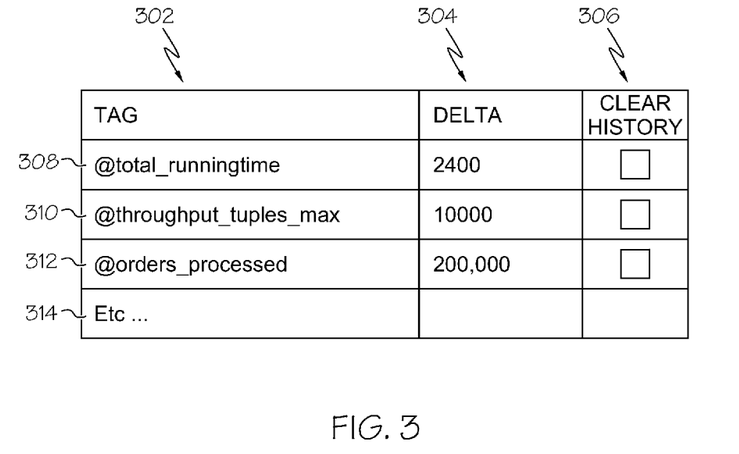
FIG. 3 is table illustrating policies that can be used by the information processing system of FIG. 2.

FIG. 3 illustrates one example of a set of policies stored in the policies repository 216 of FIG. 2. The table shown in FIG. 3 includes at least 3 policies indicated by the rows 308, 310, 312, and 314 of the table. The first column of each row indicates a tag 302 for the particular policy being identified by the row entry 308, 310, 312, 314. The second column indicates a change value 304 which is a measurable metric for the executing application on the runtime system 102. The third column 306 indicates, when the checkbox is selected, to clear the history of previous snapshots stored in the snapshots repository 220, after saving in the repository 220 the current snapshot information for the executing application on the runtime system 102.

For example, the first policy 308 includes a tag 302 that starts with the "@" symbol followed by the text string "total running time", which indicates that the total running time of the executing application is to be monitored. The significant change value 304 for the first policy 308 indicates 2,400 units of total running time as a threshold for indicating a significant change for an executing application on the runtime system 102. A second policy 310 relates to maximum throughput as indicated by the tag 302 and the significant change value 304 would be 10,000 units. The third policy 312 relates to orders processed 312 and the significant change value 304 is 200,000. Other policies 314 may be added to the table in the policies repository 216 and associated with the executing application on the runtime system 102. These policies are used by the change detector 232 to identify when a significant change has been monitored for the executing application on the runtime system 102. Any one of the policies being triggered would cause a snapshot of the significant change being selected and captured by the information processing system 202.

Figure 4:
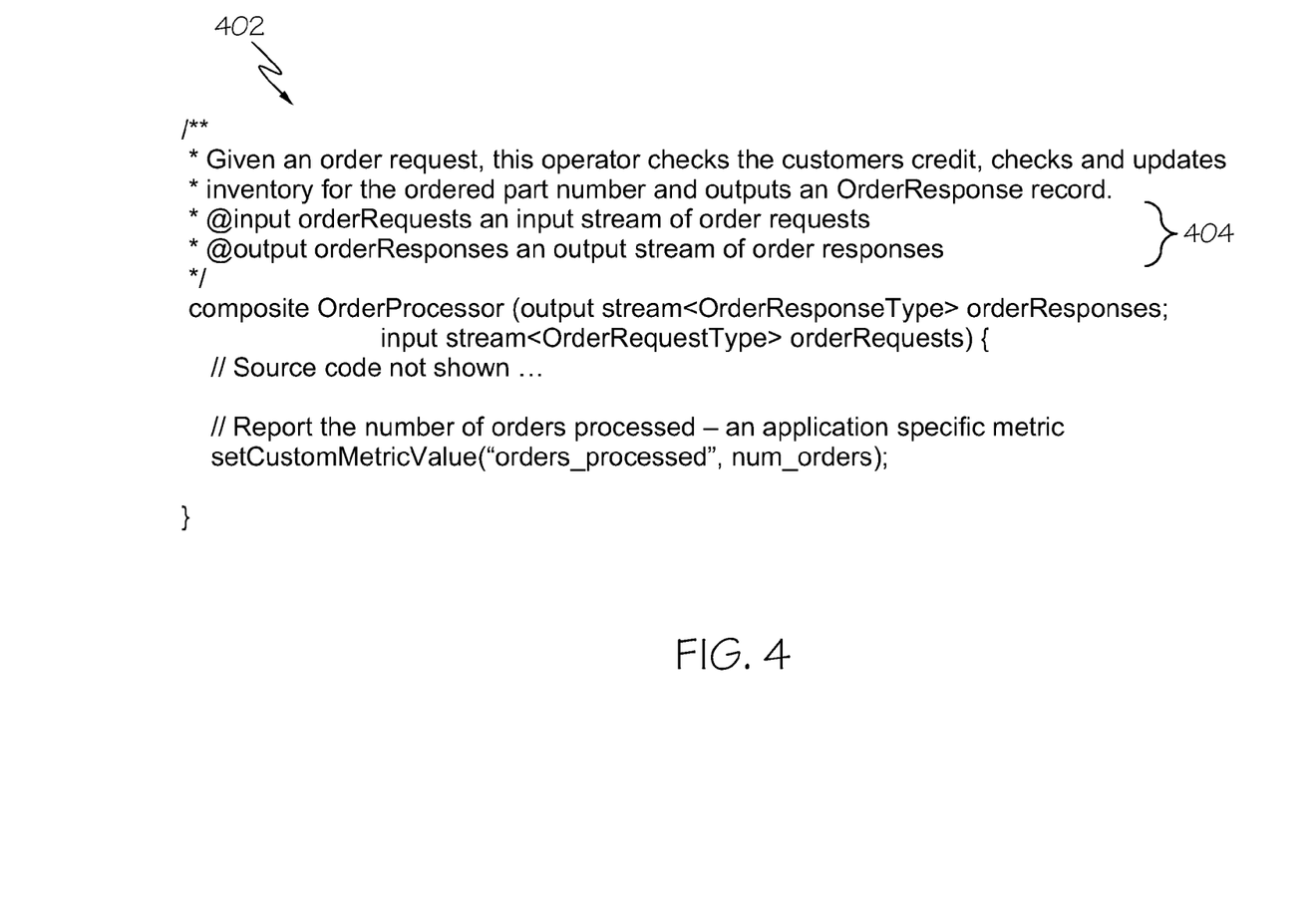
FIG. 4 is program listing illustrating a portion of an application source code with comments.
Figure 5:
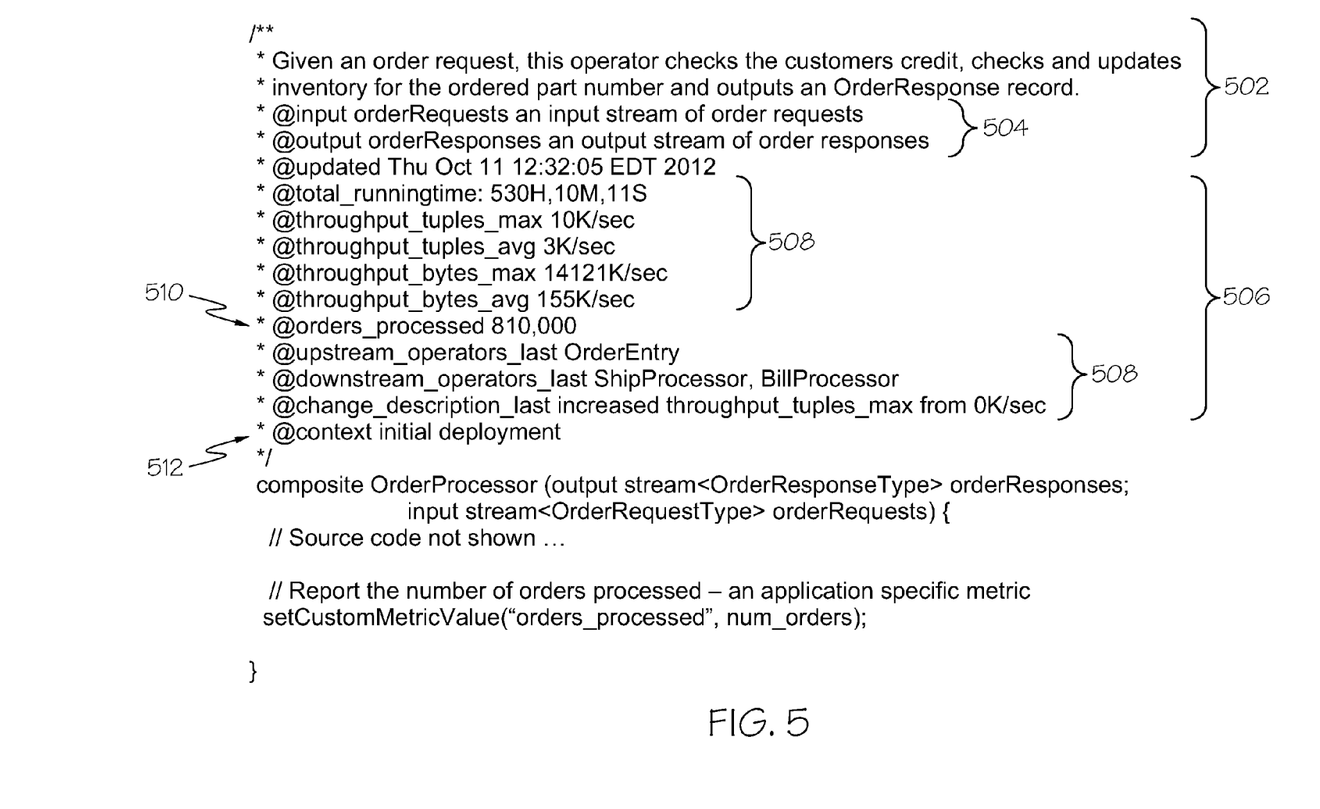
FIG. 5 is program listing illustrating a portion of an application source code with comments including information from a first snapshot of the executing application as generated with the information processing system of FIG. 2, according to an example of the present disclosure.
Figure 6:
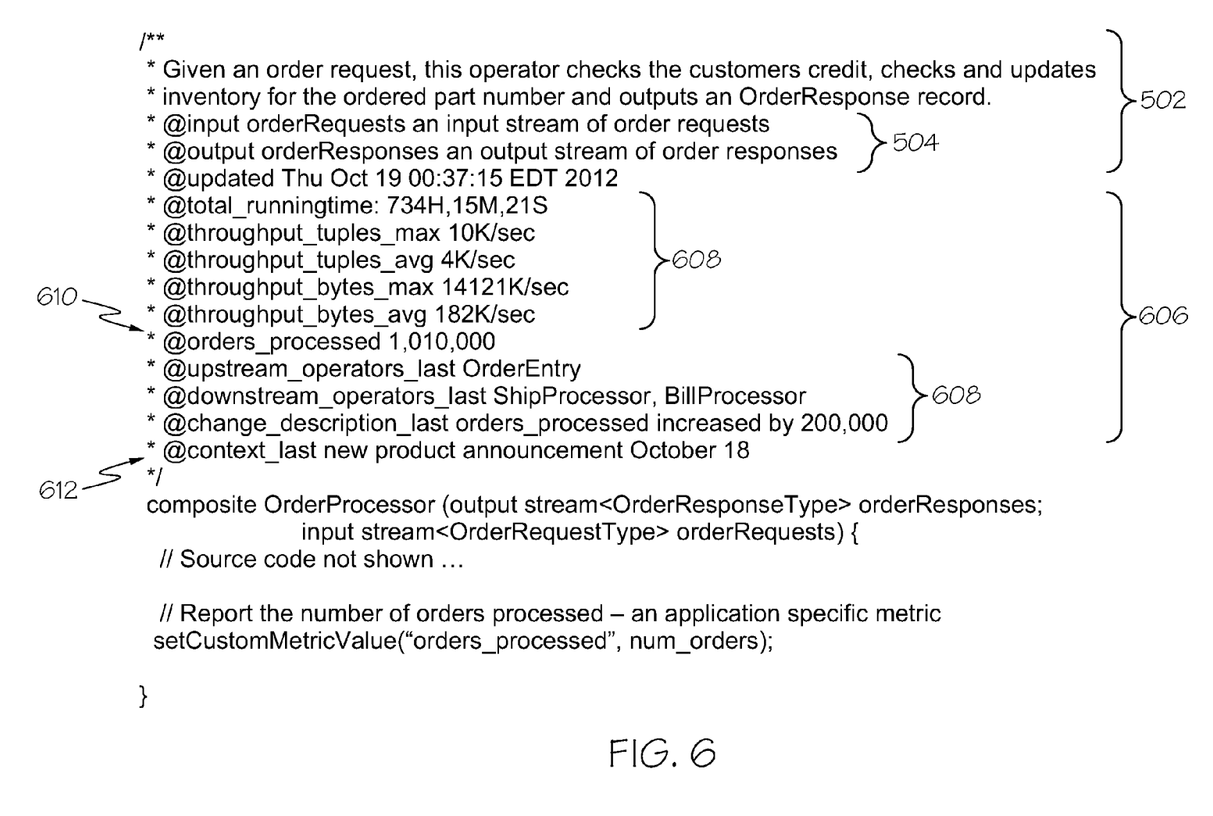
FIG. 6 is program listing illustrating a portion of an application source code with comments including information from a second snapshot of the executing application as generated with the information processing system of FIG. 2, according to an example of the present disclosure.

FIGS. 4, 5, and 6, illustrate an example of the documentation being stored and generated for a particular application executing on a runtime system 102. FIG. 4 shows the original documentation 402 for the application as generated by, typically, a programmer of the application. This is generated prior to execution of the application on the runtime system 102. The documentation 402 may include tags 404 as shown in FIG. 4.

After the application begins to execute on the runtime system 102 at some point in time, a significant change is detected by the change detector 232 and a first snapshot is collected, selected, and stored with documentation generated by the information processing system 202, as shown in FIG. 5. The original documentation 502 including the tags 504 remains with the source code artifacts documentation for the executing application on the runtime system 102. However, additional documentation is automatically added by the information processing system 202, and can be manually added too, as will be discussed below.

In this example, when the maximum throughput has reached 10,000 per second, the change detector 232 determines a significant change has occurred in the runtime behavior of the executing application. Besides collecting, selecting, and storing the first snapshot, tags, also referred to as metadata, will be updated into the source code artifacts documentation for the executing application. The information processing system 202 updates a set of tags 506 as a comment block in the source code artifacts documentation of the executing application. Specifically, the auto-annotator 234 generates a set of tags 508 that include metrics about the runtime behavior of the executing application from information captured by the monitors coupled with the runtime system 102. According to the present example, the annotating of a selected snapshot includes at least description of the significant change in runtime behavior of the executing application on the runtime system at the time the selected snapshot was collected by the snapshot collector 230. The auto-annotator 234, continuing with the present example, generates a separate tag 510 that includes metrics about the runtime behavior of the executing application from information captured by the monitors coupled with the application executing on the runtime system 102.

The manual-annotator 236 allows a user of the information processing system 202 via the user interface 210 to manually annotate by adding a tag 512 to the snapshot and that is updated in the source code artifacts documentation for the executing application, as shown in FIG. 5. The manual annotation 512 can provide semantic information from a user (such as an application system administrator or an application expert) to identify conditions under which the application was running at the time the snapshot was captured.

The enhanced documentation 502, 504, 506, 508, 510, 512, provides meaningful information to a user/programmer to help understand the functions and features of the executing application on the runtime system 102. All of the added tags 506 provide additional metric information that indicates usage information that may not necessarily be available to the original programmer of the static application. This added information in the documentation of the application provides valuable information to a programmer or user of the application to help at least to analyze, modify, and use the application.

Referring to FIG. 6, a second snapshot has been collected and stored with documentation generated by the information processing system 202. The original documentation 502 including the tags 504 remains with the source code artifacts documentation for the executing application. However, additional documentation is automatically updated by the information processing system 202, and can be manually added too, as will be discussed below.

Besides the original comments 502 including tags 504 provided by the programmer of the application, the information processing system 202 with the second snapshot information updates the source code artifacts documentation of the executing application with a set of tags 606 as a comment block in the source code artifacts documentation of the executing application. The collection and store of the second snapshot, according to the present example, is triggered by the change detector 232 detecting the occurrence of the application's runtime behavior matching the third policy 312 in which the number of orders processed increased by 200,000 (see significant change value 304 in FIG. 3) indicating a significant change occurred.

Tags (metadata) related to the second snapshot information are updated into the source code artifacts documentation for the executing application. A set of tags 608 are automatically annotated by the auto-annotator 234. The auto-annotator 234 generates a set of tags 608 that include metrics about the runtime behavior of the executing application from information captured by the monitors coupled with the runtime system 102. The auto-annotator 234, in this example, generates a separate tag 610 that includes metrics about the runtime behavior of the executing application from information captured by the monitors coupled with the application executing on the runtime system 102. The separate tag 610 indicates the number or orders processed increased by 200,000 from the previous number or orders value captured in the first snapshot. Compare tag 510 to tag 610.

The manual-annotator 236 allows a user of the information processing system 202 via the user interface 210 to manually annotate by adding a tag 612 to the second snapshot and that is updated in the source code artifacts documentation for the executing application, as shown in FIG. 6. The manual annotation 612 can provide semantic information from a user (such as an application system administrator or an application expert) to identify conditions under which the application was running at the time the second snapshot was captured. Here, a new product announcement was made on October 18$^{th}$, was the documentation manually added to the tag 612 by a user of the information processing system 202. As can be seen by the present example, progressive snapshots can be added to the source code artifact documentation for an executing application on a runtime system 102 to continuously and periodically update the documentation associated with the application with meaningful information that can assist a programmer or a user of the application.

Figure 7:
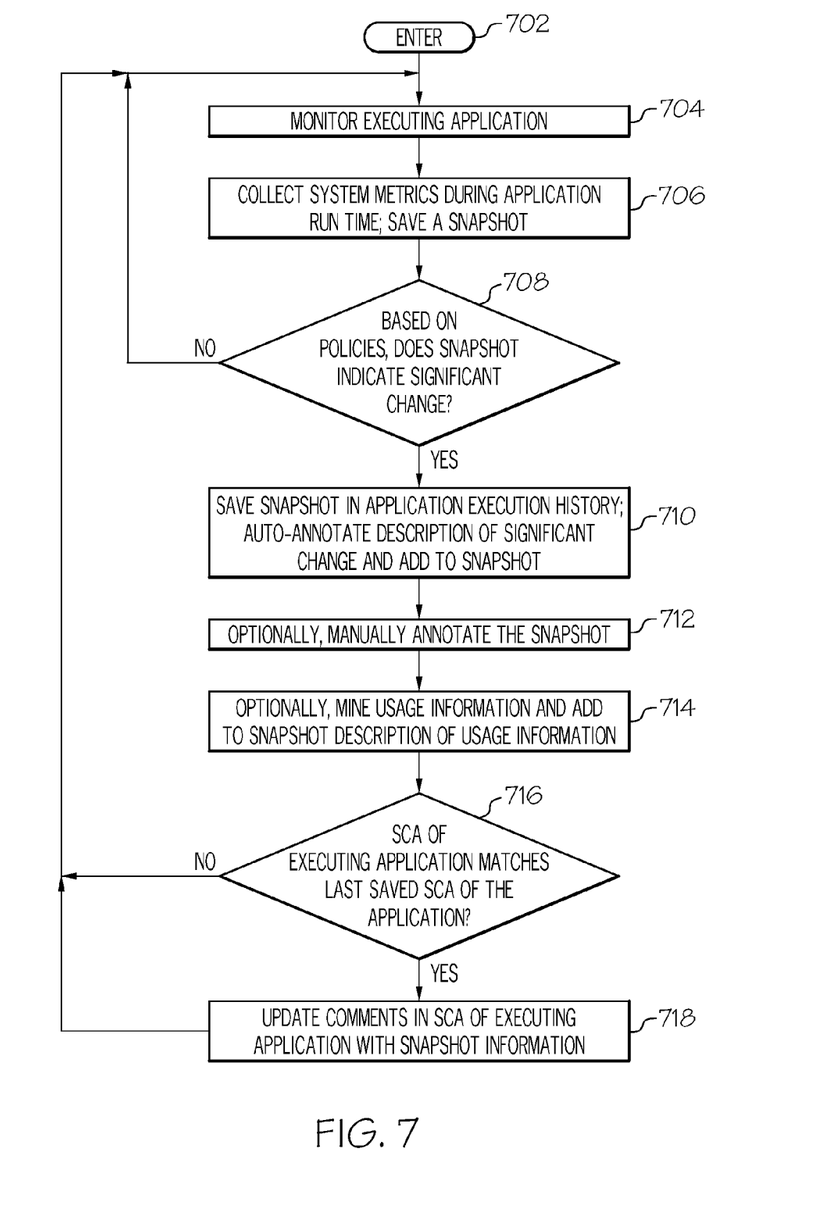
FIG. 7 is an operational flow diagram illustrating an example process followed by a processor of the information processing system of FIG. 2, according to an embodiment of the present disclosure.

Referring now to FIG. 7, the flow diagram illustrates the architecture, functionality, and operation of possible implementations of systems, methods, and computer program products according to various embodiments herein. In this regard, each block in the flow diagram may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently (or contemporaneously), or the blocks may sometimes be executed in the reverse order, depending upon the functionality involved. It will also be noted that each block of the flow diagram illustration, and combinations of blocks in the flow diagram, can be implemented by special purpose hardware-based systems that perform the specified functions or acts, or combinations of special purpose hardware and computer instructions.

FIG. 7 illustrates one example of an operational sequence for the information processing system 202 illustrated in FIG. 2. It is assumed before entering the operational sequence that a programmer has implemented an application and provided comments about the implementation in source code artifacts documentation such as illustrated in FIG. 4. The source code artifacts documentation for the application are stored in the source code artifact (SCA) documentation repository 218. Additionally, the programmer and/or an application system administrator has provided policies in the policies repository 216 that are associated with the application. Each of these policies can be used by the change detector 232 to identify a significant change in the executing application on the runtime system 102. An example of several policies that might be stored in the policies repository 216 is provided in the table shown in FIG. 3 as has been discussed above. Additionally, it is assumed that the programmer has submitted the application to be executed on the runtime system 102.

The information processing system 202 records the location of the source code artifacts associated with the application executing on the runtime system 102, and, according to the present example, computes and stores in memory 206 (or in non-volatile memory 208) a digest of the source code artifacts. The digest will be used by the information processing system 202 to verify that the source code has not been updated while the information processing system 202 has been monitoring the runtime behavior of the executing application. It is important to keep track of changes in the source code artifacts due to changes introduced in the application such as by a programmer. Snapshots of an executing application on the runtime system 102 will be meaningful as long as the stored version of the application (and its source code artifacts) has not been changed, such as by a programmer, during the monitored execution of the application on the runtime system 102.

While the application executes on the runtime system 102, monitors (not shown) associated with the application and with the runtime system 102 monitor the operational metrics and behavior of the application and communicatively couple this information to the information processing system 202. The processor/controller 204 enters the operational sequence, at step 702, and proceeds to monitor the executing application, at step 704, while interoperating with the execution monitor 228. The processor/controller 204, at step 706, collects runtime system and application metrics during the application execution and a snapshot is save by the snapshot collector 230, while interoperating with the processor/controller 204.

The processor/controller 204, at step 708, determines whether a significant change has occurred with the application executing on the runtime system 102. The change detector 232 interoperates with the processor/controller 204 to determine whether a significant change has occurred. The policies stored in the policies repository 216 that are associated with the executing application on the runtime system 102 are used by the change detector 232 to determine whether the snapshot indicates a significant change has occurred, at step 708. If no significant change has occurred, at step 708, then the processor/controller 204 continues to monitor the executing application at step 704, and continues to collect the metrics from the running application and saving a snapshot with the collected metrics, at step 706.

After the processor/controller 204 determines, at step 708, that a significant change has occurred, the snapshot is selected and stored in the snapshots repository 220 which keeps track of the application execution history for the executing application on the runtime system 102. Additionally, the processor/controller 204, interoperating with the auto-annotator 234, auto-annotates text description of the significant change and adds this to the stored snapshot, at step 710. Optionally, the processor/controller 204, interoperating with the manual-annotator 236, can prompt a user of the information processing system 202 via the user interface 210 to add manual annotation to the stored snapshot, at step 712. Optionally, the usage information miner 238, interoperating with the processor/controller 204, mines usage information (as has been discussed above) and adds text description of the usage information to the snapshot stored in the application execution history for the executing application, at step 714.

According to the present example process for the information processing system 202, the system 202 determines, at step 716, whether the executing application matches the last saved version of the application. This step determines whether the version of the application that is stored has changed as compared to the executing application on the runtime system 102. For example, and not for limitation, a programmer may have updated a current version of the application while an earlier version is executing on the runtime system. If there is a difference it would mean that the application has been changed and the snapshot information may not necessarily be valid for the current version of the application. According to the present example, the processor/controller 204 creates a digest of the last saved version of the application stored in the source code artifact documentation repository 218 and compares that digest with a digest created from the currently executing application on the runtime system 102. If the two digests do not match, at step 716, then the processor/controller 204 goes back to monitoring the executing application, at step 704. Other actions may also be taken by the information processing system 202. At this point, for example, the detected condition would be communicated to an application administrator, such as via the user interface 210, that there is a difference in the executing application as compared to the saved version of the application. The application administrator or other system administration personnel could reconcile the two versions of the application such that the executing application on the runtime system 102 would match the most current version of the application as stored in the source code artifact documentation repository 218. For example, a new job for the application could be submitted to the runtime system 102 to update the executing version of the application to match the latest version of the application stored in the repository 218.

If the source code artifacts of the executing application match the last saved source code artifacts of the stored version of the application, at step 716, the processor/controller 204 updates text comments in the source code artifacts of the executing application with the snapshot information, at step 718. It should be noted that information in the snapshot may be already represented in the comments of the source code artifact. In this case, as part of step 718, the processor/controller 204 can verify that new information is to be written, prior to generating comments in the source code artifact. Meta data, such as tags, that identify the snapshot information can be embedded into the comments of the source code artifacts of the executing application, such as the example shown in FIGS. 5 and 6. The processor/controller 204, after completing the update of the snapshot information into the stored source code artifacts of the executing application, at step 718, goes back to monitoring the executing application, at step 704.

In this way, the information processing system 202 continuously and periodically monitors the executing application on the runtime system 102 and updates with meta data (and with other related documentation) the comments in the source code artifacts documentation associated with the executing application. For example, compare the meta data shown as tags 506 in FIG. 5 with the meta data shown as tags 606 in FIG. 6. This type of enhanced documentation includes, but is not limited to, additional or changed comments showing relevant metrics, semantics, and other related information that indicates significant changes in the operational behavior of the executing application on the runtime system 102.

As will be appreciated by one of ordinary skill in the art, aspects of the various examples may be embodied as a system, method, or computer program product. Accordingly, examples herein may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects herein may take the form of a computer program product embodied in one or more computer readable media having computer readable program code embodied thereon.

Any combination of one or more computer readable media may be utilized. A computer readable medium may be a computer readable signal medium or alternatively a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electrical, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including streams programming language such as IBM's Streams Processing Language, object oriented languages such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer. The remote computer, according to various embodiments, may comprise one or more servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to various embodiments of the disclosure. It will be understood that one or more blocks of the flowchart illustrations and/or block diagrams, and combinations of blocks in the flowchart illustrations and/or block diagrams, can be implemented by computer program instructions. These computer program instructions may be provided to one or more processors, to a special purpose computer, or to other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner. Instructions stored in a computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with various embodiments, the methods described herein are intended for operation as software programs running on a computer processor. Furthermore, software implementations can include, but are not limited to, distributed processing or component/object distributed processing, parallel processing, or virtual machine processing and can also be constructed to implement the methods described herein.

While the computer readable storage medium 226 is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represent examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor 204 is illustrated for information processing system 202, information processing systems with multiple CPUs or processors can be used equally effectively. Various embodiments of the present disclosure can further incorporate interfaces that each includes separate, fully programmed microprocessors that are used to off-load processing from the processor 204. An operating system (not shown) included in main memory for the information processing system 202 is a suitable multitasking and/or multi-processing operating system, such as, but not limited to, any of the Linux, UNIX, Windows, and Windows Server based operating systems. Various embodiments of the present disclosure are able to use any other suitable operating system. Some embodiments of the present disclosure utilize architectures, such as an object oriented framework mechanism, that allows instructions of the components of operating system (not shown) to be executed on any processor located within the information processing system. The input/output interface module(s) 222 can be used to provide an interface to at least one network. Various embodiments of the present disclosure are able to be adapted to work with any data communications connections including present day analog and/or digital techniques or via a future networking mechanism.

Although the illustrative embodiments of the present disclosure are described in the context of a fully functional computer system, those of ordinary skill in the art will appreciate that various embodiments are capable of being distributed as a computer program product via CD or DVD, e.g. CD, CD ROM, or other form of recordable media, or via any type of electronic transmission mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The term "source code artifact" is intended to broadly mean a set of source code. The source code may be implemented in a programming language, like IBM's Streams Processing Language. The set of source code may be, but is not limited to, source code that is used to implement a Streams operator, function, or type.

The term "source code artifact documentation" is intended to broadly mean the comments authored by a programmer, by another person, or by an information processing system, which are associated with a source code artifact. As an example, and not for limitation, see the comments below:

```
/**
* Given an input stream, this operator filters out the bad data, and outputs
* only the good data.
*/
composite Filter (InputStream in, OutputStream out) {
    // code not shown
}
```

By way of example, this disclosure would supplement the above comment authored by the programmer with information on the application's runtime behavior:

```
/**
* Given an input stream, this operator filters out the bad data, and outputs
* only the good idea.
*
* Maximum input rate: 2M messages / sec, 50Mb / sec
* Maximum output rate: 2M messages / sec 50Mb / sec
* Maximum duration: 57 hours, 12 minutes, 11 seconds
* Adjacent upstream FileSource 50%. Functor 20%, other 30%
* Adjacent downstream Split 80%, Barrier 10%. other 10%
*
*/
composite Filter (InputStream in, OutputStream out) {
    // code not shown
}
```

The term "snapshot" is intended to broadly mean a collection of metrics on an executing application's runtime behavior. A snapshot, for example, and not for limitation, may include the throughput rates, CPU usage, memory usage, executions, or errors reported, application identifiers (e.g. file name, version, constituent source code artifacts), and other similar type of information.

The term "job" is intended to broadly mean an executable instance of an application, such as a Streams Processing Language application.

The term "dynamic connection updates" is intended to broadly mean changing an operator, as used in a streams processing language and the like, that terminates the beginning or end of a stream connection while the application is executing. This includes creating a new connection between operators.

The term "policies" is intended to broadly mean events, conditions, or thresholds, that constitute an "interesting" change of state of an executing application, such as a runtime job of a Streams Processing Language application. Monitoring that an executing application matches the "interesting" change of state indicates acquiring a new snapshot. The following list includes, but is not limited to, several examples of policies: whenever a new application is deployed on a runtime system, whenever the topology of the application changes, when the throughput rates of an executing application change by 10%, etc.

The term "co-usage statistics" is intended to broadly mean statistics gathered about which other source code artifacts are used by, deployed with, or connected to a particular source code artifact. For example, a co-usage statistic may include, but is not limited to: 80% of the time a FileSource operator is connected to the input port of a Filter operator.

The terms "Streams Processing Language" and "SPL" are intended to broadly mean a programming language that specifies a set of operators and the communication connections (i.e. streams) between the operators. For example, IBM's Streams Processing Language may be used in connection with code for an application to execute on one of IBM's InfoSphere Streams products. An embodiment of this disclosure may, but is not limited to, use an application coded using an SPL.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope and spirit of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A method, with a processor of an information processing system, for documenting execution of long running applications, comprising:

continuously collecting, with a processor of an information processing system communicatively coupled with a runtime system, snapshots monitored from an executing application on the runtime system;

selecting collected snapshots that indicate a significant change in runtime behavior of the executing application on the runtime system, wherein significant changes are determined based at least on user specified policies;

annotating, with the processor, each of the selected snapshots with at least description of the significant change in runtime behavior of the executing application on the runtime system at the time the selected snapshot was collected;

storing and updating documentation of an execution history of the executing application on the runtime system from the collected and annotated snapshots; and updating a set of annotations in the source code artifacts documentation of the executing application, describing the significant change in runtime behavior of the executing application, wherein the set of annotations comprises at least meta data.

2. The method of claim 1, further comprising:
manually annotating, with the processor, at least one of the selected snapshots with at least semantic information about the significant change in runtime behavior of the executing application on the runtime system at the time the selected snapshot was collected.

3. The method of claim 2, wherein the manually annotating comprises:
accepting, with the processor, user input from a user of the information processing system via a user interface, the manual annotation in the selected snapshot including at least a portion of the user input describing in natural language the semantic information about the significant change in runtime behavior of the executing application on the runtime system at the time the selected snapshot was collected.

4. The method of claim 1, wherein the continuously collecting snapshots comprises:
monitoring the runtime system and collecting monitored information about the executing application, the collected monitored information including at least one of:
performance of the executing application on the runtime system;
status of the executing application on the runtime system;
health of the executing application on the runtime system; and
a metric of the runtime behavior of the executing application on the runtime system.

5. The method of claim 1, wherein the user specified policies comprise at least one policy that specifies an event of interest and that is related to the executing application such that the information processing system, with the processor, can determine occurrence of the event of interest and thereby what snapshots to select that indicate a significant change in runtime behavior of the executing application on the runtime system.

6. The method of claim 5, wherein the event of interest comprises a monitored metric of the runtime system that indicates a runtime behavior of the executing application on the runtime system.

7. The method of claim 5, wherein the event of interest comprises a monitored metric of the application that indicates a runtime behavior of the executing application on the runtime system.

8. The method of claim 1, wherein the selecting collected snapshots comprises:
comparing, with the processor, a value of a metric in a current collected snapshot with a value of a corresponding metric in the last previous collected and annotated snapshot included in the execution history; and
determining whether the current collected snapshot belongs in the execution history, based on a result of the comparing and on a user specified policy corresponding to the metric.

9. The method of claim 1, wherein the annotating each of the selected snapshots comprises:
summarizing, using natural language, a significant change detected in a value of a metric in a current collected snapshot as compared with a value of a corresponding metric in the last previous collected and annotated snapshot included in the execution history, by explaining how the significant change relates to a user specified policy corresponding to the metric.

10. The method of claim 1, further comprising:
mining usage information about the executing application from the stored documentation of the execution history of the executing application; and
updating source code artifacts documentation of the executing application with at least the mined usage information.

11. The method of claim 10, further comprising:
associating documentation in the stored documentation of an execution history of the executing application on the runtime system to source code artifacts documentation of the executing application stored in a source code artifacts documentation repository.

12. The method of claim 11, further comprising:
computing statistics about the mined usage information, performance of the executing application on the runtime system, and health of source code artifacts of the executing application.

13. The method of claim 12, further comprising:
determining at least one of:
outliers of metrics of the runtime behavior of the executing application on the runtime system;
frequently used source code artifacts associated with the executing application on the runtime system;
co-usage statistics of source code artifacts associated with the executing application on the runtime system; and
other relevant metrics of interests about source code artifacts associated with the executing application on the runtime system.

14. The method of claim 13, wherein the updating source code artifacts documentation of the executing application comprises:
updating the source code artifacts documentation of the executing application to include documentation with at least one of
computed statistics about the mined usage information;
computed statistics about the performance of the executing application on the runtime system;
computed statistics about the health of source code artifacts of the executing application;
determined outliers of metrics of the runtime behavior of the executing application on the runtime system;
determined frequently used source code artifacts associated with the executing application on the runtime system;
determined co-usage statistics of source code artifacts associated with the executing application on the runtime system; and
determined other relevant metrics of interests about source code artifacts associated with the executing application on the runtime system.

15. The method of claim 1, wherein the meta data comprises a tag that is automatically annotated and embedded in the comments documentation associated with the source code artifacts of the executing application on the runtime system, the tag including a measured metric for the executing application on the runtime system.

16. An information processing system comprising:
at least one interface module communicatively coupled with a runtime system that executes at least one application thereon;
a policies repository;
a snapshots repository;
and a processor communicatively coupled to the memory, the policies repository;
the interface module, and the snapshots repository, wherein the processor, responsive to executing computer instructions, performs operations comprising:
continuously collecting snapshots monitored from an executing application on the runtime system;
selecting collected snapshots that indicate a significant change in runtime behavior of the executing application on the runtime system, wherein significant changes are determined based at least on user specified policies;
annotating each of the selected snapshots with at least description of the significant change in runtime behavior of the executing application on the runtime system at the time the selected snapshot was collected;
storing and updating documentation of an execution history of the executing application on the runtime system from the collected and annotated snapshots; and
updating a set of annotations in the source code artifacts documentation of the executing application, describing the significant change in runtime behavior of the executing application, wherein the set of annotations comprises at least meta data.

17. The information processing system of claim 16, wherein the processor, responsive to executing the computer instructions, performs operations comprising:
manually annotating, with the processor, at least one of the selected snapshots with at least semantic information about the significant change in runtime behavior of the executing application on the runtime system at the time the selected snapshot was collected.

18. The information processing system of claim 17, further comprising a graphical user interface communicatively coupled with the processor, and wherein the manually annotating comprises:
accepting, with the processor, user input from a user of the information processing system via the graphical user interface, the user input describing in natural language the semantic information about the significant change in runtime behavior of the executing application on the runtime system at the time the selected snapshot was collected.

19. The information processing system of claim 16, wherein the user specified policies comprise at least one policy that specifies an event of interest and that is related to the executing application such that the information processing system, with the processor, can determine occurrence of the event of interest and thereby what snapshots to select that indicate a significant change in runtime behavior of the executing application on the runtime system.

20. The information processing system of claim 19, wherein the event of interest comprises a monitored metric of the application that indicates a runtime behavior of the executing application on the runtime system.

21. A non-transitory computer readable storage medium, comprising computer instructions which, responsive to being executed by a processor, cause the processor to perform operations comprising:
continuously collecting, with a processor of an information processing system communicatively coupled with a runtime system, snapshots monitored from an executing application on the runtime system;
selecting collected snapshots that indicate a significant change in runtime behavior of the executing application on the runtime system, wherein significant changes are determined based at least on user specified policies;
annotating, with the processor, each of the selected snapshots with at least description of the significant change in runtime behavior of the executing application on the runtime system at the time the selected snapshot was collected;
storing and updating documentation of an execution history of the executing application on the runtime system from the collected and annotated snapshots; and
updating a set of annotations in the source code artifacts documentation of the executing application, describing the significant change in runtime behavior of the executing application, wherein the set of annotations comprises at least meta data.

22. The computer readable storage medium of claim 21, comprising computer instructions which, responsive to being executed by the processor, cause the processor to perform operations comprising:
manually annotating, with the processor, at least one of the selected snapshots with at least semantic information about the significant change in runtime behavior of the executing application on the runtime system at the time the selected snapshot was collected.

23. The computer readable storage medium of claim 22, comprising computer instructions which, responsive to being executed by the processor, cause the processor to perform operations comprising:
accepting, with the processor, user input from a user of the information processing system via a user interface, the user input describing in natural language the semantic information about the significant change in runtime behavior of the executing application on the runtime system at the time the selected snapshot was collected.

24. The computer readable storage medium of claim 21, comprising computer instructions which, responsive to being executed by the processor, cause the processor to perform operations comprising:
summarizing, using natural language, a significant change detected in a value of a metric in a current collected snapshot as compared with a value of a corresponding metric in a last previous collected and annotated snapshot included in the execution history, by explaining how the significant change relates to a user specified policy corresponding to the metric.

25. The computer readable storage medium of claim 21, comprising computer instructions which, responsive to being executed by the processor, cause the processor to perform operations comprising:
mining usage information about the executing application from the stored documentation of the execution history of the executing application; and
updating source code artifacts documentation of the executing application with at least the mined usage information.

* * * * *